(12) United States Patent
Patrick et al.

(10) Patent No.: US 9,566,659 B2
(45) Date of Patent: Feb. 14, 2017

(54) CHAMBER WITH LOW TURBULENCE ARGON PURGING SYSTEM

(75) Inventors: Lee Patrick, Sherwood, OR (US); David Brayshaw, Happy Valley, OR (US); Scott Wittkop, Beavercreek, OR (US); James Barrett, Milwaukie, OR (US); Ting-Kwo Lei, Clackamas, OR (US)

(73) Assignee: PCC Structurals Inc., Portland, OR (US)

(*) Notice: Subject to any disclaimer, the term of this patent is extended or adjusted under 35 U.S.C. 154(b) by 646 days.

(21) Appl. No.: 13/452,969

(22) Filed: Apr. 23, 2012

(65) Prior Publication Data

US 2012/0199636 A1 Aug. 9, 2012

Related U.S. Application Data

(62) Division of application No. 12/903,502, filed on Oct. 13, 2010, now abandoned.

(60) Provisional application No. 61/251,751, filed on Oct. 15, 2009.

(51) Int. Cl.
*B23K 1/00* (2006.01)
*B23K 9/32* (2006.01)

(52) U.S. Cl.
CPC .................................. *B23K 9/325* (2013.01)

(58) Field of Classification Search
USPC ............................................................ 312/1
See application file for complete search history.

(56) References Cited

U.S. PATENT DOCUMENTS

| | | | | |
|---|---|---|---|---|
| 2,786,740 A | * | 3/1957 | Taylor et al. | 312/1 |
| 2,918,563 A | | 6/1957 | Ternisien et al. | |
| 3,188,446 A | * | 6/1965 | Ray | 219/72 |
| 3,895,570 A | * | 7/1975 | Eagleson, Jr. | 454/57 |
| 3,986,850 A | * | 10/1976 | Wilcox | 55/355 |
| 4,078,167 A | | 3/1978 | Banas et al. | |
| 4,098,174 A | * | 7/1978 | Landy | 454/57 |
| 4,100,847 A | * | 7/1978 | Norton | 454/57 |
| 4,480,585 A | | 11/1984 | Gattuso | |
| 4,599,505 A | | 7/1986 | Lukens et al. | |
| 4,667,580 A | * | 5/1987 | Wetzel | 454/187 |
| 4,880,581 A | | 11/1989 | Dastoli et al. | |
| 5,219,215 A | * | 6/1993 | Akagawa et al. | 312/1 |

(Continued)

FOREIGN PATENT DOCUMENTS

| | | |
|---|---|---|
| JP | 8090255 A | 4/1996 |
| KR | 19990073182 B1 | 8/2002 |
| KR | 1020040091636 A | 10/2004 |

OTHER PUBLICATIONS

John Straube, "BSI-022: The Perfect HVAC", Jul. 10, 2009, http://www.buildingscience.com/documents/insights/bsi-022-the-perfect-hvac.

*Primary Examiner* — Keith Walker
*Assistant Examiner* — Carlos Gamino
(74) *Attorney, Agent, or Firm* — The Webb Law Firm

(57) ABSTRACT

Apparatus and method for purging atmospheric air from a chamber with a gas including means for generating a substantially non-turbulent, laminar flow front of the gas into the chamber with minimal turbulence to displace the atmospheric air in the chamber, the chamber having exhaust means associated therewith to permit the displaced atmospheric air to exit the chamber. The chamber is preferably a welding chamber and the gas is preferably argon.

7 Claims, 8 Drawing Sheets

(56) References Cited

U.S. PATENT DOCUMENTS

| | | | |
|---|---|---|---|
| 5,235,152 A | | 8/1993 | Jankus |
| 5,319,179 A | | 6/1994 | Joecks et al. |
| 5,347,103 A | * | 9/1994 | LeMieux ................... 219/400 |
| 5,419,886 A | * | 5/1995 | Grantham et al. ............ 423/251 |
| 5,473,258 A | * | 12/1995 | Abe ...................... 324/750.19 |
| 5,556,559 A | | 9/1996 | Bjorkman, Jr. et al. |
| 5,685,771 A | | 11/1997 | Kleppen |
| 5,730,777 A | * | 3/1998 | Petersen et al. ................. 95/12 |
| 5,814,789 A | | 9/1998 | O'Leary et al. |
| 6,124,568 A | * | 9/2000 | Broderick et al. ... 219/137 WM |
| 6,261,171 B1 | | 7/2001 | Lee |
| 6,583,387 B2 | * | 6/2003 | Kelly et al. ............... 219/137 R |
| 6,772,827 B2 | | 8/2004 | Keller et al. |
| 6,783,563 B1 | * | 8/2004 | Eckhoff et al. ................ 55/356 |
| 7,129,436 B1 | | 10/2006 | Corne |
| 7,159,755 B2 | | 1/2007 | Martins et al. |
| 7,780,248 B2 | * | 8/2010 | Granadino ..................... 312/1 |
| 2003/0038564 A1 | * | 2/2003 | Drinkwater ..................... 312/1 |
| 2005/0103754 A1 | | 5/2005 | Olsen |
| 2009/0230094 A1 | | 9/2009 | Corne |

\* cited by examiner

CHAMBER WITH LOW TURBULENCE ARGON PURGING SYSTEM

CROSS REFERENCE TO RELATED APPLICATIONS

This application is a division of U.S. patent application Ser. No. 12/903,502 filed Oct. 13, 2010, which claims priority to U.S. Provisional patent application No. 61/251,751 filed on Oct. 15, 2009, the entire contents of which are incorporated by reference herein.

BACKGROUND OF THE INVENTION

1. Field of the Invention

The present invention relates generally to apparatus and methods for purging atmospheric air from an enclosed chamber, such as a welding chamber, and replacing the air with an inert gas.

2. Description of Related Art

In the manufacture/repair of complex investment cast shapes for aerospace, medical and land based systems markets, it is oftentimes necessary to perform a welding operation.

For some alloys, particularly titanium alloys, there is a requirement to perform welding in a sealed chamber of argon. In this application, a part is loaded into a chamber and the air is removed by introducing argon to the chamber and expelling the air through mixing/volume exchanges.

The current methodology used to obtain an acceptable inert atmosphere in a chamber or enclosed work area for processes such as welding, an atmosphere with extremely low oxygen, <60 ppm $O_2$ and moisture levels, >−40° F. is obtained as follows. The standard method to purge a non-interlock chamber is to pipe argon into the chamber at a high rate of flow, the argon mixing with the air already in the chamber, which causes both high purity argon and air to be exhausted from the chamber to atmosphere until an acceptable work environment is obtained.

This current production method used to purge large non-interlock welding chambers (e.g. 11'×5'×4') typically takes a minimum of 8-9 volume changes of argon and 30 plus minutes to obtain an acceptable welding environment. This process wastes large quantities of argon and time (decreases throughput and creates a large amount of idle time).

SUMMARY OF THE INVENTION

The present invention solves the problems heretofore encountered in purging-enclosed chambers by providing a system which greatly reduces the time and gas required to purge atmospheric air from the chamber and replace it with another gas, such as argon. The present invention accomplishes this desired result by introducing the replacement/purge gas into the enclosed chamber using a low turbulence, high flow purge system that produces a laminar flow front which displaces the atmospheric air in the chamber with very little mixing of the air and replacement/purge gas, such as argon. In a non-turbulent flow state, the argon remains below the atmospheric air in the chamber due to the higher density of argon relative to air and pushes the air from the chamber through exhaust means at the top of the chamber. The invention also provides a significant savings in the amount of inert gas, such as argon, required to displace the air in the chamber compared with current purging systems/methods. Briefly stated, the system of the present invention includes an enclosed chamber, a perforated plate having a plurality of through holes positioned within the chamber, a purge support plate positioned in a spaced relationship beneath the perforated plate and manifold means communicating with a plurality of spaced-apart diffusers mounted on the purge support plate. An inert gas source, such as argon, communicates with the manifold means. The inert gas passes through the diffusers and enters the space between the purge support plate and the perforated plate to subsequently pass through the spaced-apart holes and enter the chamber in a laminar flow front to purge the atmospheric air from the chamber. The chamber includes controlled vent means to permit the egress of the purged air and inert gas therefrom.

DETAILED DESCRIPTION OF THE INVENTION

Figure 1:
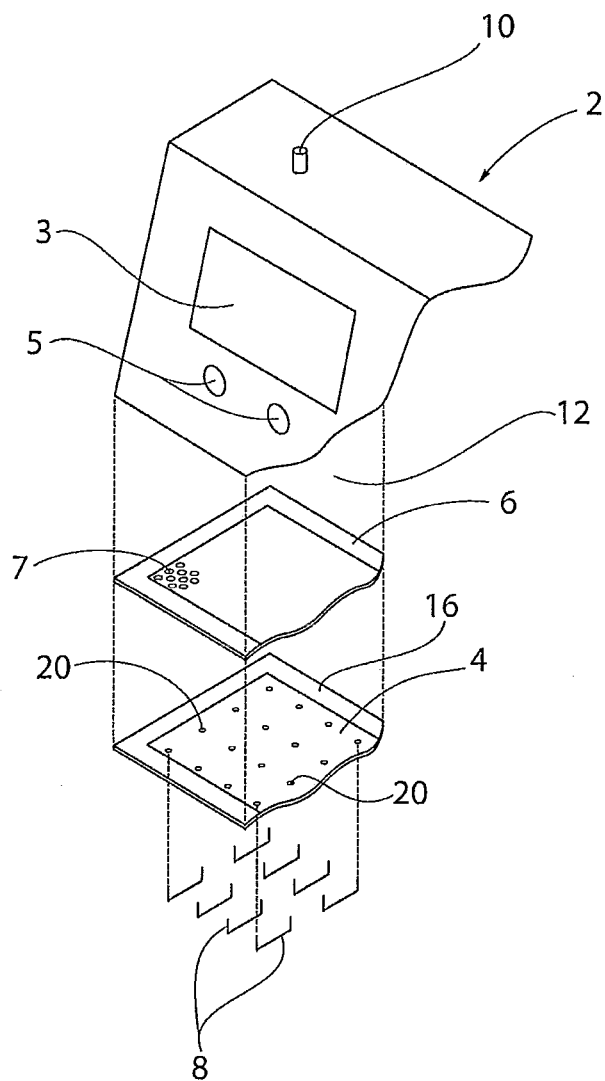
FIG. 1 is a fragmented, isometric, exploded view of the invention in a weld chamber.
Figure 2:
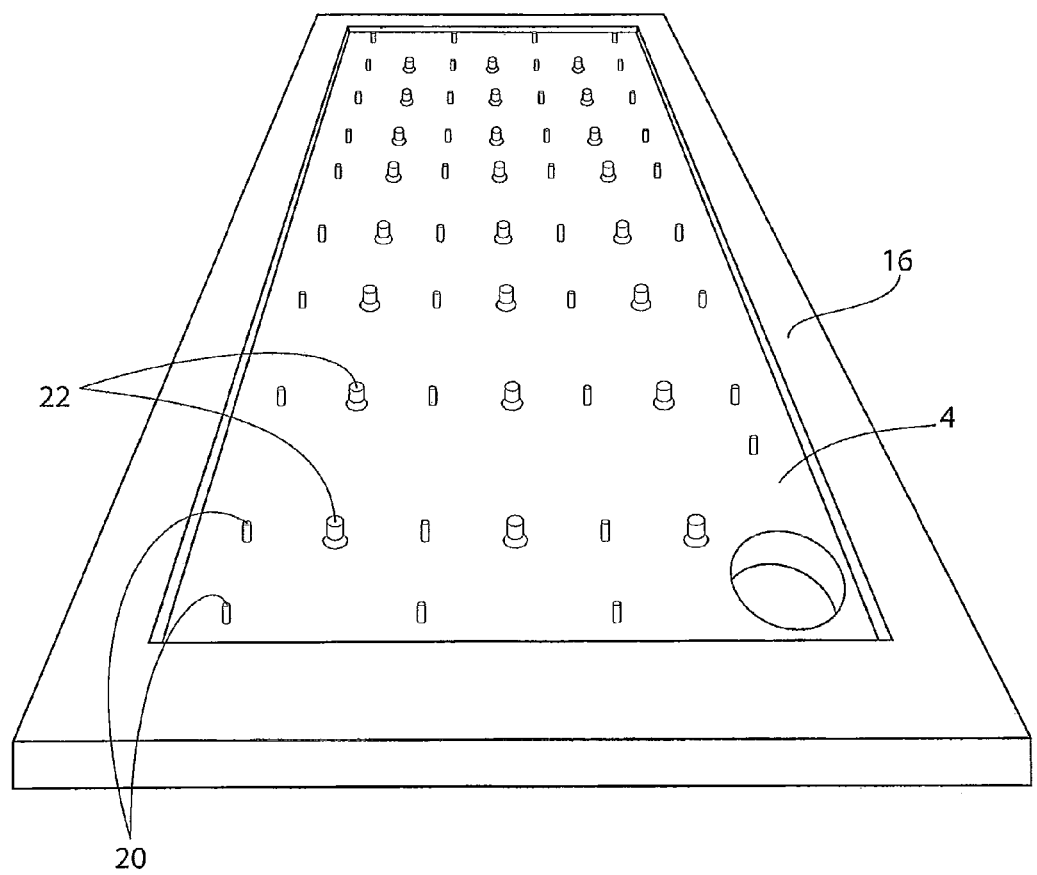
FIG. 2 is a perspective view of the purge/support plate of the invention.
Figure 3:
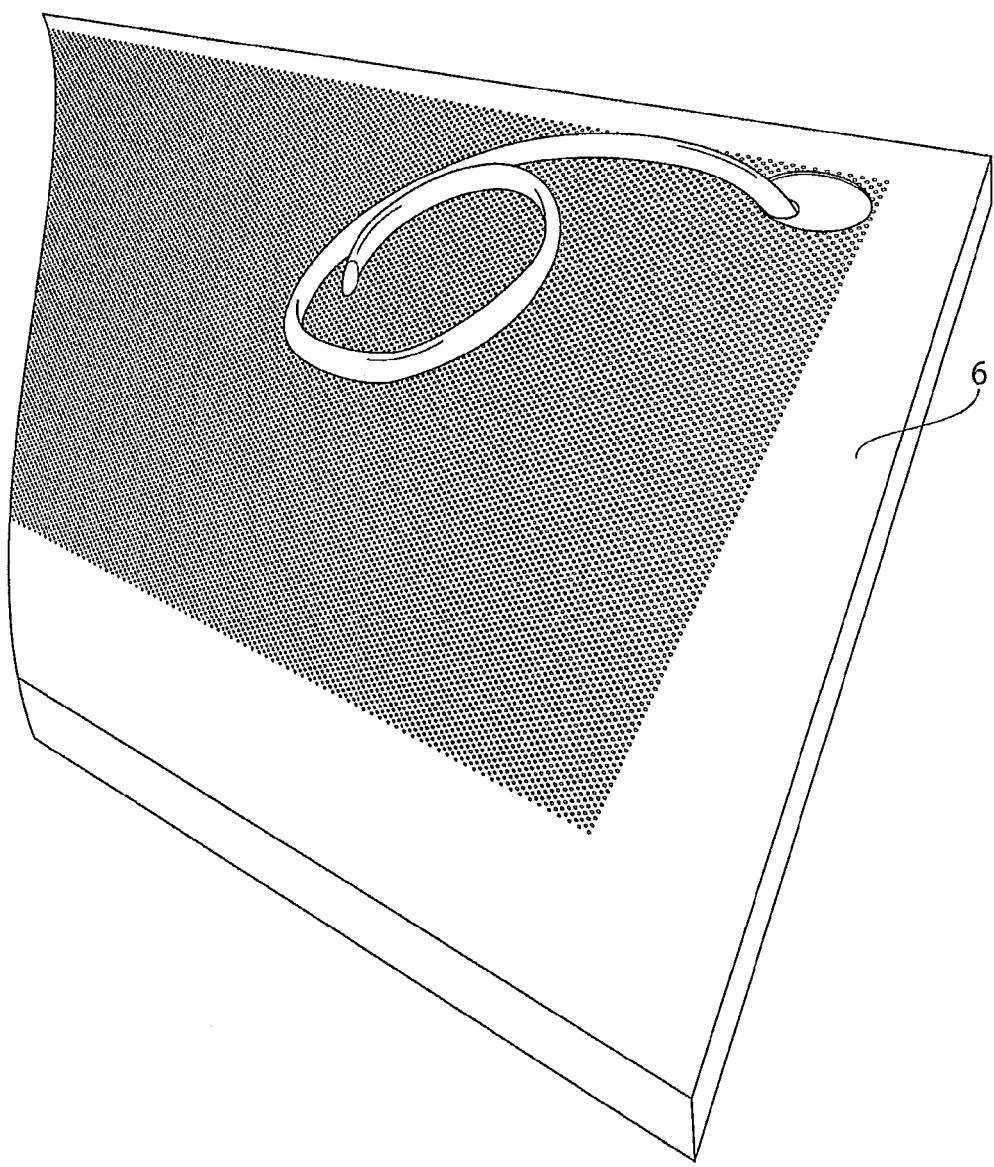
FIG. 3 is a perspective view of a portion of the perforated table top/work platform plate of the invention.
Figure 4:
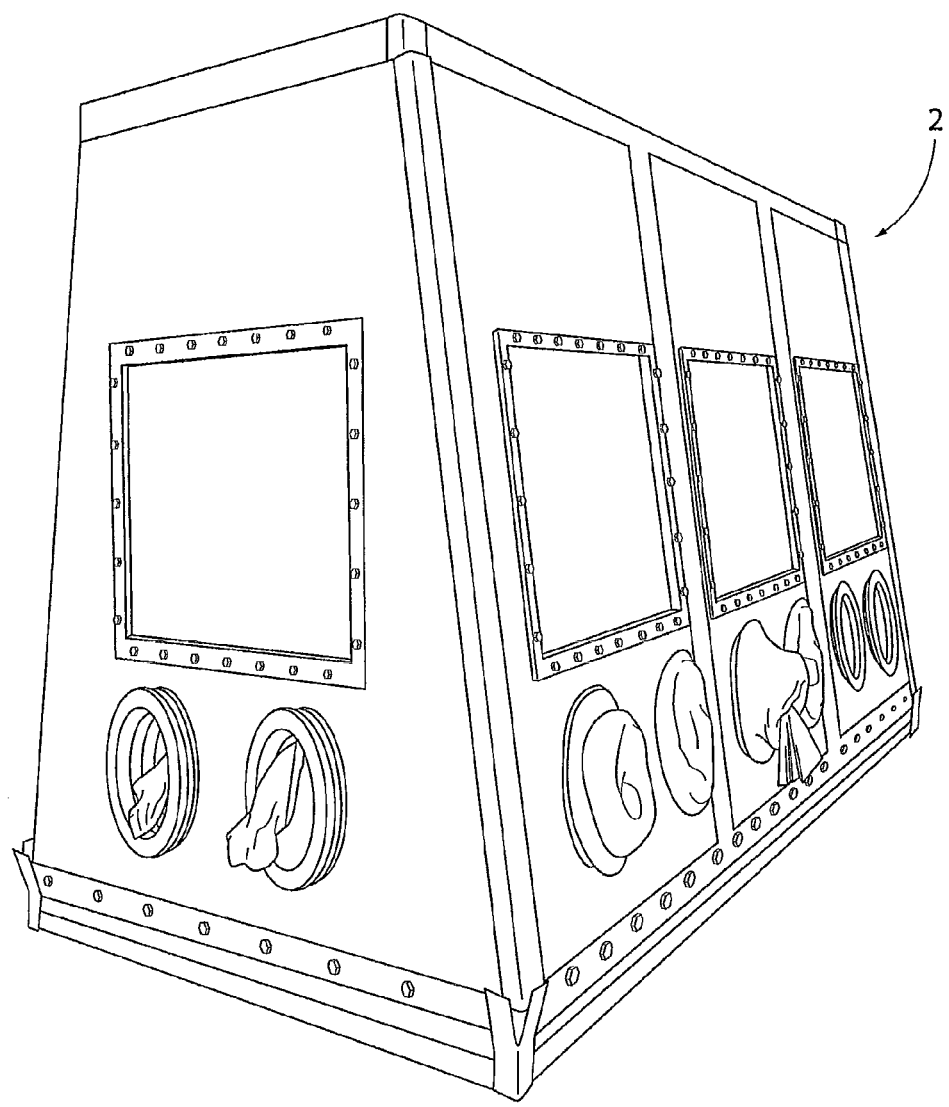
FIG. 4 is an elevation view of a welding chamber in which the purge system of the invention is used.
Figure 5:
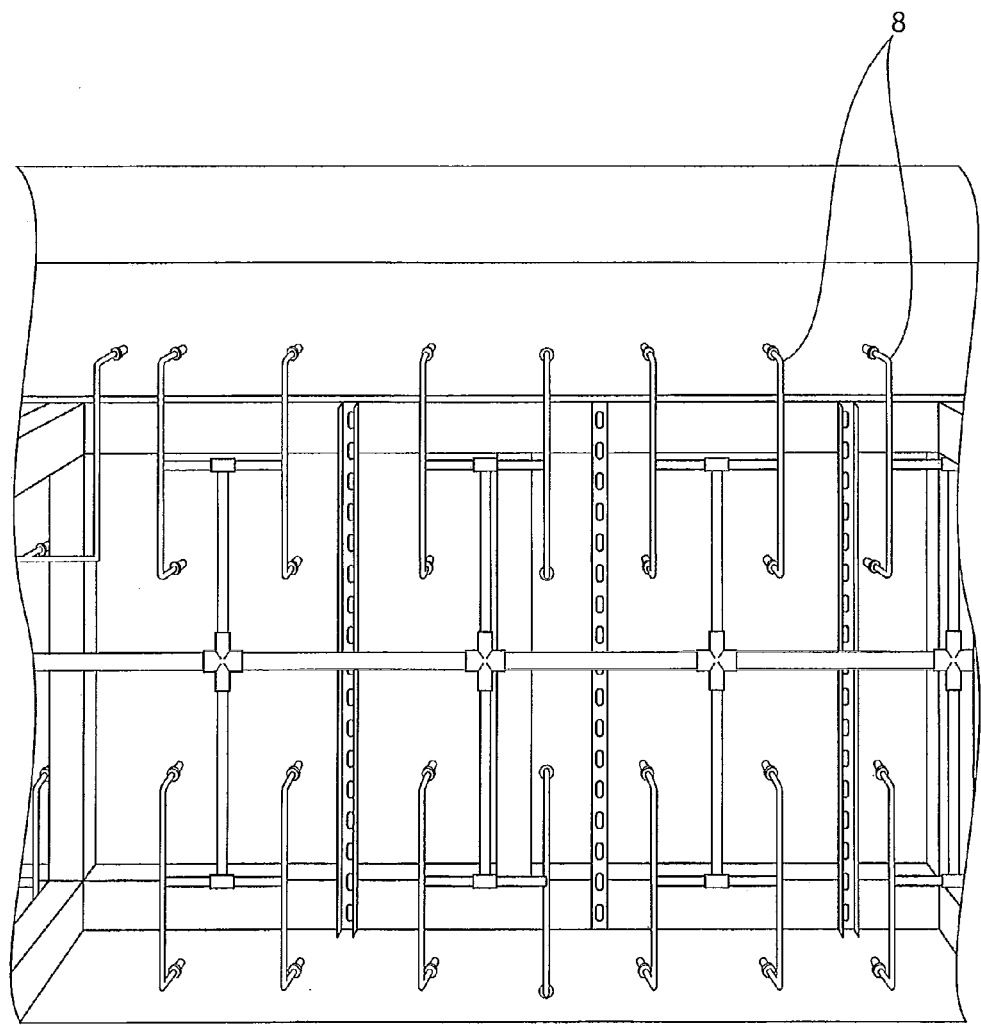
FIG. 5 is a perspective view of the piping manifold on the underside of the purge plate of FIG. 2.
Figure 6:
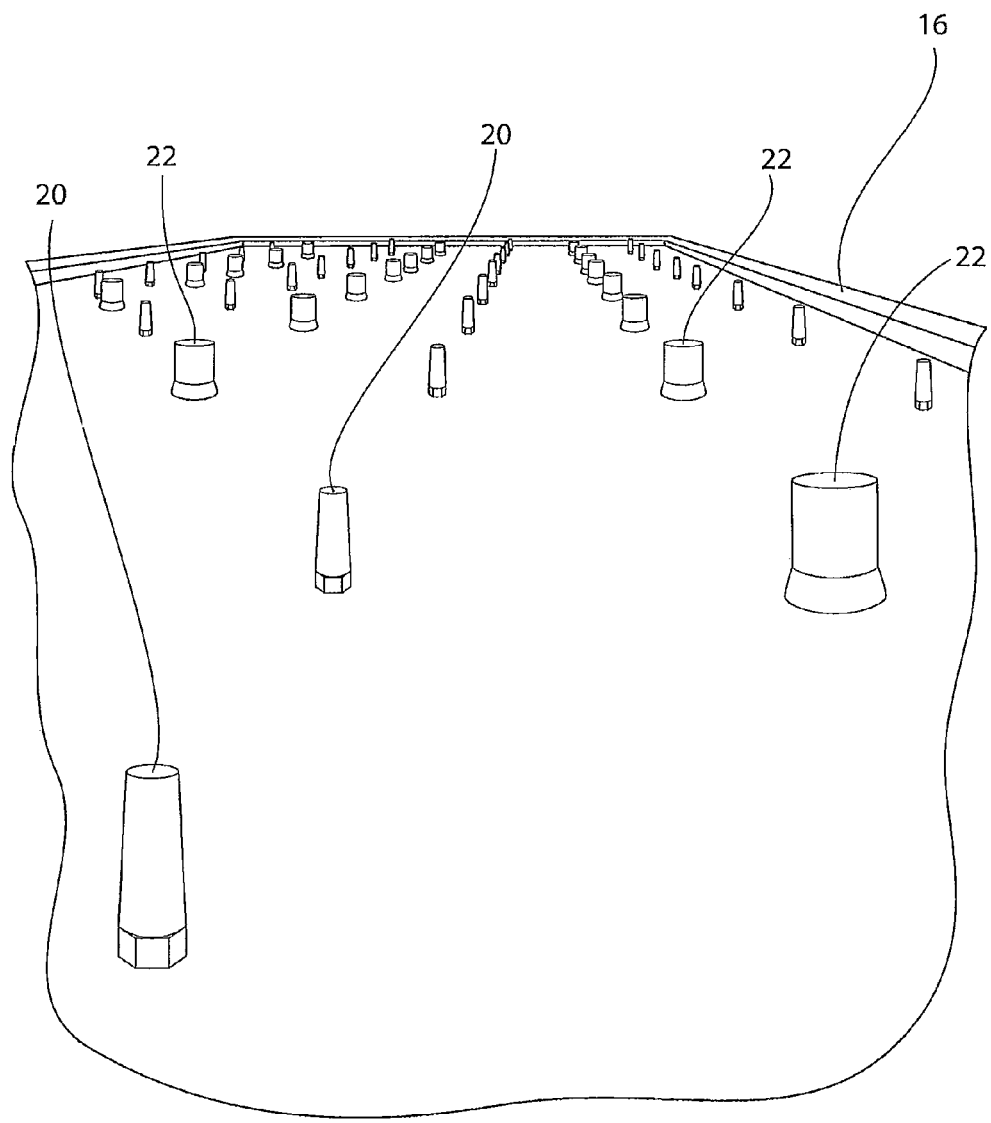
FIG. 6 is a perspective view of the purge/support plate of FIG. 2 viewed from another angle showing a spaced-apart array of gas diffusers and support members mounted on the upper side of the purge plate.
Figure 7A:
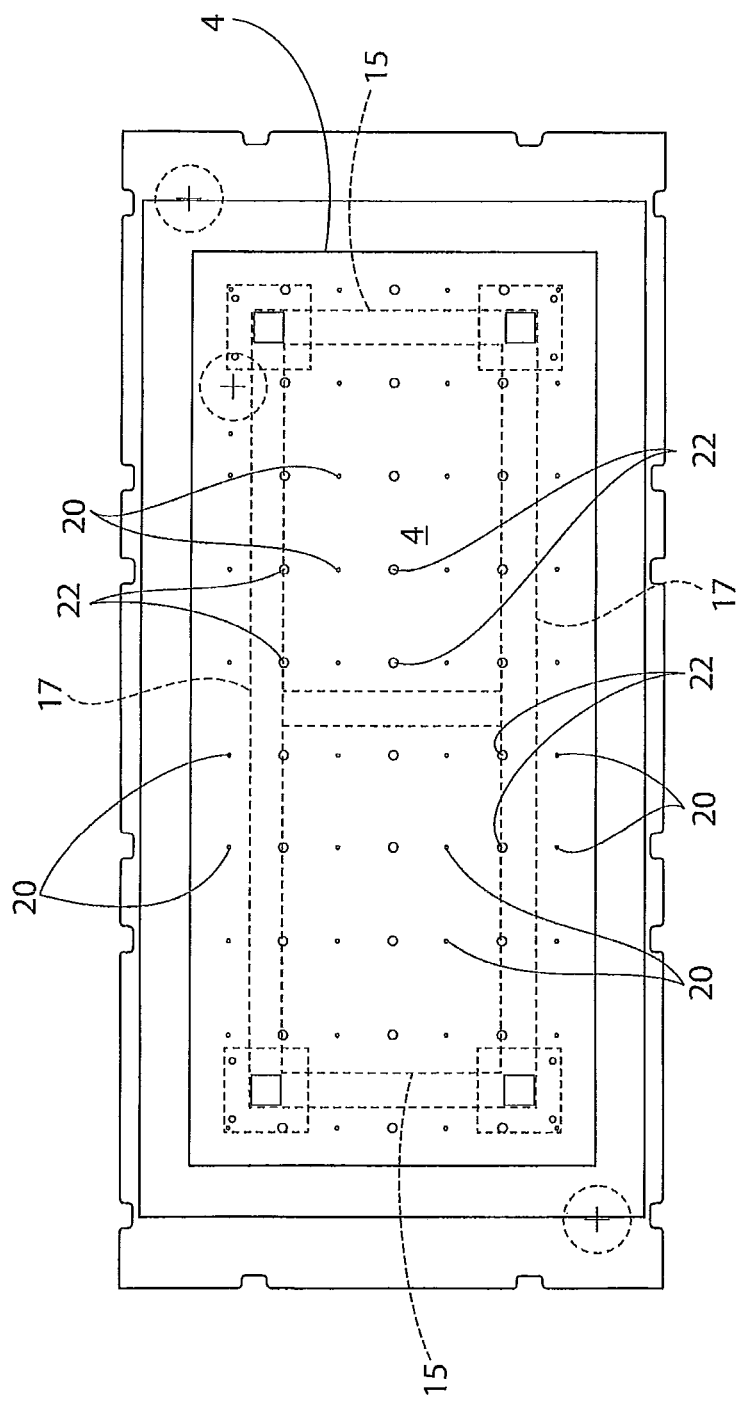
FIG. 7(A) is a plan view of the work table with the purge plate and perforated work support plate of the invention depicted therein.
Figure 7B:
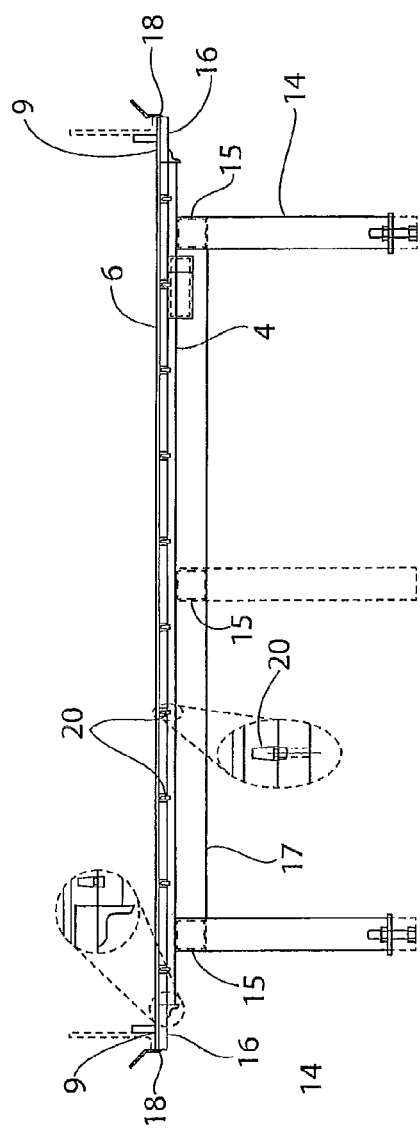
FIG. 7(B) is a front elevation view of the work table with the purge plate and perforated work support plate of the invention depicted therein.
Figure 7C:
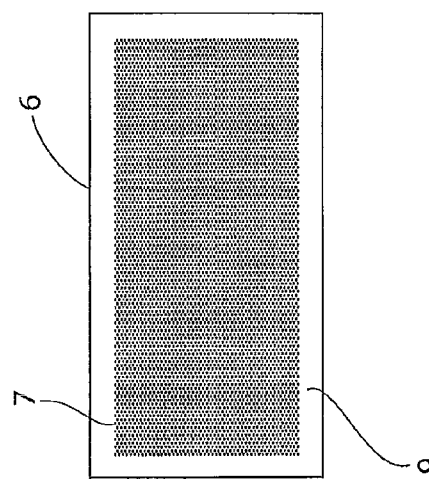
FIG. 7(C) is a plan view of the perforated work support plate.

As shown in FIG. 1, the present invention not only recognizes the density difference between argon and air but also relies on the inert gas distribution system to provide a non-turbulent, laminar flow front of inert gas. This system is designed to provide for multiple inlets which rapidly distribute a large volume of inert gas such as argon at a low pressure across the entire chamber floor. This is accomplished by controlling pipe size and the addition of flow restriction diffuser devices to equalize the flow of all supply outlets. Also, the exhaust outlet must be sized to accommodate a high flow with minimal back pressure. This system can also be accompanied with a perforated plate system which protects piping outlets/flow restriction device, increases uniformity of gas flow, and also provides a stable working platform to support the workpiece to be welded, for example.

A presently preferred embodiment of the invention depicted in the drawings is directed to a welding chamber 2, but it will be understood that the invention is useful for other types of chambers where an inert atmosphere is required for work to be performed.

As depicted in FIG. 1, the welding chamber 2 is a housing which encloses an airtight interior space 12 within which the welding operation is to be performed. The welding chamber 2 includes one or more conventional viewing windows 3 and sealed, gloved ports 5 for the welder to gain access to the airtight interior space 12. The present invention provides a laminar flow of an inert gas such as argon into the interior space 12 of the welding chamber 2 by way of two spaced-apart plates 4 and 6 and a gas manifold system 8. While the welding chamber 2 is shown in the figures as having a rectangular cross-section in the plan view, other cross-sectional shapes, including without limitation a square-, circle-, or oval-shaped cross-section configuration, could also be employed.

The first of these plates is a steel purge/support plate 4 with a raised flange 16 around its perimeter. A plurality of spaced-apart diffusers 20 are situated on the plate 4 wherein each diffuser communicates with a pipe of the manifold system 8 for the supply of inert gas thereto. The diffusers 20 are made up of a sintered mass of metal spheres having a predetermined porosity to permit a controlled gas flow therethrough. In the presently preferred embodiment, the porosity of the diffusers is about 40 microns. A presently preferred diffuser 20 is sold by Granger Industrial Supply, referred to in the Granger catalog as an exhaust muffler and identified as Granger item #1A325 at catalog page No. 3290. It will be understood that the type of diffuser and its porosity will depend upon the specific application and the gas flow desired.

In the present embodiment, the purge/support plate 4 measures about 5 feet wide and 10 feet long and is fitted with forty diffusers 20 at a spacing of about 11 inches in each of four longitudinally extending rows, with ten diffusers 20 in each row.

Between the rows of diffusers 20 are situated a plurality of spaced-apart steel support spacers 22 which are tac welded to the purge plate 4. The spacers 22 are about 1 inch diameter cylindrical pieces and extend upwardly from the plate 4 about 1 inch, which is slightly higher than the tops of the diffusers 20.

The top plate is a perforated steel plate 6 which serves the dual function of supporting the workpiece during welding and also to distribute the inert gas within the welding chamber 2. The perforated plate 6 has a plurality of spaced-apart holes 7 formed therethrough for the passage of inert gas into the chamber 2. The through holes 7 are, by way of example, ¼ inch in diameter and spaced apart at 1 inch increments in each row. The holes 7 in a row are staggered or offset from the holes 7 in adjacent rows. For purposes of economy, the steel plate 6 is about ¼ inch thick to permit the holes 7 to be punched rather than individually drilled. Accordingly, two of the ¼ inch thick plates 6 are used and placed one on top of the other with the through holes 7 in alignment in each of the ¼ inch plates to provide a composite perforated plate 6 that is ½ inch in total thickness. A ½ inch thick plate 6 is desired in the welding operation to provide the necessary strength to support a workpiece and resist warpage due to the thermal effects of the welding operation.

The perimeter of the perforated plate 6 is placed on the raised flange 16 of the purge plate 4 and is secured thereto around the perimeter by screws, for example, with a gas sealing gasket 18 applied between the flange 16 and the perimeter of the plate 6. The plurality of support spacers 22 engage the central area of the underside of the perforated plate 6 and maintain a small spaced-apart relationship between the underside of the plate 6 and the tops of the diffusers 20 so as not to damage or crush the diffusers which might otherwise occur.

In order to create a raised platform or work table of a convenient height for the weld chamber 2, a plurality of vertical legs 14, cross beams 15, and longitudinal beams 17 are provided to support the purge plate 4 and the attached upper perforated plate 6. As stated above, the upper perforated plate also functions as the workpiece support table top.

A vent 10 is associated with the welding chamber 2 in communication with the interior space 12 thereof. The vent 10 opens and closes in a controlled manner to permit air and/or gas to be purged from the interior 12 of the chamber 2. The vent 10 is opened for the initial purge cycle and closes when purging is complete. The inert gas flow rate and vent size, diffuser porosity, etc. are determined depending upon the application or size of the chamber 2.

An experimental mockup chamber 2 was constructed, measuring 2'×2'×2'6". Improved purging was demonstrated using diffusers 20. Argon gas initial purging of atmospheric air from this mockup chamber was accomplished in six minutes using four diffusers 20 and a ½" diameter vent 10 with a flow rate of argon of 2.5 cubic feet per minute (CFM).

A full size welding chamber 2 described above measuring about 11'×5'×4' was also purged in six minutes using forty diffusers 20 (porosity 40 microns) using a 4 inch diameter vent 10 and an additional 1½ inch diameter vent and a flow rate of argon of over 100 CFM for optimum results in the initial purge. Initial purging was also successful at lower flow rates, but at an argon flow rate of 70 CFM, the purge time dropped off. Initial purging trials on the mockup chamber using two flow rates, 2.5 CFM (150 CF/hour) and 50 CFH showed the same savings in argon usage, namely, about a 50% savings in argon over standard production. The lower purging gas flow rate, however, took about three times longer than the higher flow rate since the lower flow rate was only ⅓ that of the higher rate.

The low turbulence initial purge cycle provided by the laminar flow front of the present invention reduces the initial atmospheric air containing 21% oxygen in the chamber 2 to an atmosphere of less than 60 parts per million of oxygen, which is ideal for the welding operation.

After an acceptable atmosphere is obtained within the chamber 2 after the initial purge step, the flow rate of argon is decreased dramatically in a step referred to as the maintenance purge. In the present example, the argon flow may be controlled at three levels. High flow is controlled at >100 CFM of argon in the initial purge; a lower flow is controlled at about 12 CFM of argon in the maintenance purge; and a standby level is set in which there is no continuous flow, just short duration bursts of argon are used to maintain a set chamber pressure.

During the initial purge of atmospheric air from the chamber, the exhaust gas may be analyzed to determine the oxygen content in order to control the flow of argon (or other inert gas) into the chamber according to the three levels of flow discussed above. The gas pressure in the chamber is also monitored and controlled to adjust the inert gas flow rates and to maintain the set chamber gas pressure during welding. An argon gas pressure in the weld chamber of between 3"-4" of water column (manometer) has been found to be satisfactory for production purposes. Instead of analyzing the oxygen content in the exhaust gas, we prefer to conduct a simple weld test wherein a weld bead is deposited on a test plate within the chamber 2. If the weld bead is shiny, it indicates that there is an acceptable low level of oxygen present. On the other hand, if the weld bead on the test plate is discolored, the oxygen level is too high and additional purging is conducted.

After the initial purge of the welding chamber 2 has taken place and an acceptable oxygen level has been obtained, a simple timer device may then be used for subsequent initial purge cycles of that chamber based on the time required for initial purging in the previous cycle.

Thus, it will be understood that the present invention provides a low turbulence, high flow purge system that produces a laminar flow front which displaces the air in the chamber with very little mixing, so as to greatly improve the cost and efficiency of the purge process. The initial trials of the apparatus and method of the present invention showed a 50% reduction in argon usage and up to a 75% reduction in standby/turnaround time for each pre-purge cycle.

The above-described weld chamber 2 using an argon atmosphere is ideally suited for welding workpieces made of titanium based alloys, titanium aluminides, nickel based materials, or other alloys requiring an inert atmosphere during welding. The present invention is also suitable for use in purging and maintaining an inert atmosphere in interlock or antechambers used in combination with large weld chambers where it is desired to constantly maintain an inert atmosphere.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A welding chamber, comprising:
  a housing defining an interior space;
  an apparatus for purging atmospheric air from the interior space with a gas, the apparatus comprising a perforated plate system configured for generating a substantially low-turbulent, laminar flow front of gas into the interior space with low turbulence to displace the atmospheric air in the interior space, wherein the flow front of the gas creates a purge flow front that minimizes mixing of the gas with the atmospheric air within the interior space, and
  an exhaust outlet in communication with the interior space to permit the displaced atmospheric air to exit the interior space,
  wherein the perforated plate system comprises:
  a perforated plate positioned within the chamber and defining a bottom of the interior space, the perforated plate having a plurality of spaced-apart holes formed therethrough,
  a purge support plate positioned in a spaced relation beneath the perforated plate, said purge support plate having a plurality of spaced-apart diffusers affixed thereto, and
  a manifold means communicating with the diffusers and adapted to supply the gas to the diffusers, whereby the gas is emitted to the diffusers to enter the space between the purge support plate and the perforated plate to pass through the holes in the perforated plate creating a low turbulent, laminar flow front of gas extending across the bottom of the interior space and flowing upward from the bottom of the interior space toward a ceiling of the housing to displace the atmospheric air in the interior space.

2. The chamber of claim 1, wherein the exhaust outlet is a vent.

3. The chamber of claim 1, wherein the exhaust outlet is located at a top of the housing.

4. The chamber of claim 1, further comprising at least one viewing window disposed in a sidewall of the housing.

5. The chamber of claim 1, further comprising at least one sealed, gloved port providing access to the interior space.

6. The chamber of claim 1, further comprising a plurality of support spacers between the purge support plate and the diffusers to maintain a spaced-apart relationship between an underside of the perforated plate and the plurality of diffusers.

7. A welding chamber, comprising:
  a housing defining an interior space;
  an apparatus for purging atmospheric air from the interior space with a gas, the apparatus comprising a perforated plate system comprising:
  a perforated plate positioned within the chamber and defining a bottom of the interior space, the perforated plate having a plurality of spaced-apart holes formed therethrough,
  a purge support plate positioned in a spaced relation beneath the perforated plate, said purge support plate having a plurality of spaced-apart diffusers affixed thereto, and
  a manifold means communicating with the diffusers and adapted to supply the gas to the diffusers, whereby the gas is emitted to the diffusers to enter the space between the purge support plate and the perforated plate to pass through the holes in the perforated plate creating a low turbulent, laminar flow front of gas extending across the bottom of the interior space and flowing upward toward a vent disposed at a top of the housing to displace the atmospheric air in the interior space,
  wherein the vent permits the displaced atmospheric air to exit the interior space.

* * * * *